United States Patent Office 3,334,154
Patented Aug. 1, 1967

3,334,154
FLAME RETARDANT MIXED POLYCARBONATE RESINS PREPARED FROM TETRABROMO BISPHENOL-A
James K. S. Kim, Woonsocket, R.I., assignor to General Electric Company, a corporation of New York
No Drawing. Filed Feb. 28, 1966, Ser. No. 530,359
3 Claims. (Cl. 260—860)

ABSTRACT OF THE DISCLOSURE

A moldable flame resistant composition consisting of in admixture a major portion of an aromatic polycarbonate resin and a lesser amount of a copolymer of tetrabromobisphenol-A and bisphenol-A. Specifically, it is an admixture of 70–99 weight percent of the aromatic polycarbonate resin and correspondingly 30–1 weight percent of the copolymer.

---

This application is a continuation-in-part of copending application Ser. No. 260,296 filed Feb. 21, 1963 now abandoned.

This invention relates to thermoplastic resin compositions and more particularly is concerned with moldable polycarbonate resin mixtures having improved flame resistance.

Aromatic carbonate polymers are well known, commercially available materials having a variety of applications in the plastics art. Such carbonate polymers may be prepared by reacting a dihydric phenol, such as 2,2-bis-(4-hydroxyphenyl)-propane, (bisphenol-A) with a carbonate precursor such as phosgene, in the presence of an acid binding agent. Generally speaking, aromatic polycarbonate resins offer a high resistance to the attack of mineral acids, may be easily molded, and the physiologically harmless as well as stain resistant. Such polymers also have a high tensile and impact strength, a high heat resistance, and a dimensional stability far surpassing that of any other thermoplastic material.

Although parts molded of aromatic polycarbonate resins may be considered to be self-extinguishing, i.e., will extinguish within 20 seconds after removal of a contacting flame, there remain several commercial applications where successful operation of a polycarbonate part necessitates a flame resistance of the order of 10 seconds or less. Also, the addition of certain other thermoplastic resins to polycarbonates to provide moldable resin mixtures having improved craze resistance, as disclosed in copending application Ser. No. 209,215 filed July 11, 1962, and assigned to the same assignee as the present invention, results in a deterioration of the flame-resistant properties of the polycarbonate. In such cases, it would be desirable to improve the flame resistance of such mixtures to a level at least equal to the unmodified polycarbonate without affecting any of the desirable properties of the mixtures.

As known to those skilled in the art, a variety of methods have been proposed in an effort to increase the flame resistance of moldable polycarbonate resins. However, such methods have never been entirely satisfactory since they generally have an adverse effect either on the polycarbonate resins themselves or upon their moldability. For example, chlorine-substituted dihydric phenols such as 2,2-bis-(3,5-dichloro-4-hydroxyphenyl)-propane (referred to herein as tetrachloro bisphenol-A) have been employed to provide carbonate polymers having a fairly high flame resistance. Unfortunately, however, such carbonate polymers have an inconveniently high fabrication temperature and are thus commercially unsuitable for use in molding applications. It has also been suggested to prepare carbonate copolymers from tetrachloro bisphenol-A and bisphenol-A. However, unless the molar amount of the chlorinated bisphenol in the copolymer is only minor, the copolymers are handicapped by their high fabrication temperatures and not suitable as molding compounds. On the other hand, the flame resistance of a copolymer containing only a minor amount of the chlorinated bisphenol units is not materially greater than the flame resistance of the homopolymeric bisphenol-A polycarbonate.

Polycarbonate resin mixtures of homopolymeric bisphenol-A carbonate and homopolymeric tetrachloro bisphenol-A polycarbonate have also been considered. For example, U.S. Patent 3,038,874 discloses physical mixtures of highly polymeric homopolymers composed of from 70 to 80 mole percent of homopolymeric bisphenol-A polycarbonate and from 20 to 30 mole percent of homopolymeric tetrachloro bisphenol-A polycarbonate. Although such mixtures exhibit a fairly high degree of flame resistance, they are primarily suitable for use in the production of solution cast film and are unsuitable as molding compounds due again to their very high fabrication temperatures. In addition, the patent discloses that to prepare carbonate copolymers of tetrachloro bisphenol-A and bisphenol-A has resulted in the copolymer having poor flexibility.

The addition of inorganic flame retardants such as antimony oxide to polycarbonate resins has also been suggested. However, such addition has been found to result in excessive degradation of the polycarbonate during the molding operation. Substitution of organic flame retardants, such as chlorinated hydrocarbons, for example, for the inorganic additives also causes excessive decomposition of the polycarbonate during the molding operation. Consequently, a means for improving the flame resistance of polycarbonate resins without affecting any of their desirable properties, and notably the ease with which such resins may be molded, has heretofore not been available.

Unexpectedly, it has been discovered that the flame resistance of polycarbonate resins may be substantially increased and their beneficial properties of impact strength and moldability are effectively retained by incorporating therewith, in certain proportions, a particular modifier consisting of a carbonate copolymer of tetrabormobisphenol-A and another compound selected from the group consisting of a dihydric phenol, a glycol and a dicarboxylic acid and mixutres thereof.

Briefly stated, it has been found that moldable, flame-resistant polycarbonate resin can be obtained by employing a particular modifier in admixture with a polycarbonate resin. The mixtures of this invention are obtained by admixing a copolymer modifier with a polycarbonate resin in amounts such that the weight of the copolymer is 31–1.0 and preferably 30–10.0 weight percent based on the total weight of the polycarbonate resin mixture with the balance being a polycarbonate resin. When amounts less than 1.0 weight percent are used, the improvement in the flame resistance of the polycarbonate is not readily detectable, and where the amount exceeds about 30 weight percent of the copolymer in the mixture, the mixture loses the beneficial properties of the unmodified polycarbonate such as moldability and impact strength. Such addition may be accomplished in any manner so long as a thorough distribution of the modifier in the polycarbonate resin is obtained. For example, the mixing of the materials may be accomplished by any one of the variety of methods normally employed for incorporation of plasticizers and fillers of thermoplastic polymers including but not limited to mixing rolls, dough mixers, Banbury mixers, extruders, and other mixing equipment. The resulting mixtures may be handled in any conventional manner employed for the fabrication or manipulation of thermoplastic resins. The mixtures may be formed or molded using compression, injection, calendering and extrusion techniques. It should be understood that the polycarbonate resin mixtures prepared in accordance with the invention may also contain, in addition to the above-mentioned modifier, other additives to lubricate, prevent oxidation, or lend color to the material. Such additives are well known in the art and may be incorporated without departing from the scope of the invention.

The carbonate copolymers used to provide the novel resin mixtures of the invention can be prepared by any of the well known methods which include reacting such materials as tetrabromobisphenol-A [2,2 bis-(3,5-dibromo-4-hydroxyphenyl)-propane] and another compound such as bisphenol-A [2,2 bis-(4-hydroxyphenyl)-propane] with a phosgnee in accordance with any of the methods set forth in the subsequent discussion of the preparation of the polycarbonate resins contemplated by the invention.

The carbonate copoylmer modifier employed to provide the moldable flame-resistant polycarbonate resin of the instant invention is a copolymer prepared by reacting 45–25 weight percent and preferably 40–30 weight percent of tetrabromobisphenol-A and correspondingly, 55–75 and preferably 60–70 weight percent of another compound which may be either a dihydric phenol, a glycol or a dicarboxylic acid or mixtures thereof, said weights are based on the total weight of the copolymer. In addition, the carbonate copolymer modifier has an intrinsic viscosity of 0.2–0.7 (as measured in deciliters per gram of p-dioxane at 30.0° C.). Typical examples of the other compounds which can be employed to prepare the copolymer modifier which can be used in place of the bisphenol-A in the tetrabromobisphenol-A/bisphenol-A carbonate copolymer as employed in the Examples are dihydric phenols such as hydroquinone, resorcinol, 2,2 bis-(4 - hydroxyphenyl) - pentane, 2,4′ dihydroxydiphenyl methane, 2,6 dihydroxy naphthalene, bis-(4-hydroxyphenyl)-sulfone, 4,4′dihydroxydiphenyl ether, etc.; glycols such as ethylene glycol, propylene glycol, tetramethylethylene glycol, etc.; and dicarboxylic acids such as adipic acid, isophthalic acid, sebacic acid, etc.; and mixtures of any of the above. However, the preferred copolymer to be employed in the practice of this invention is a copolymer of tetrabromobisphenol-A and bisphenol-A of 65 weight percent and 35 weight percent, respectively.

A particular advantage of the present inventiton resides in the fact that craze-resistant polycarbonate resin mixtures (containing additives such as polyethylene, polypropylene, polyisobutylene, copolymers of ethylene and propylene, cellulose acetate butyrate, or copolymers of ethylene and an alkyl acrylate, as described in copending application Ser. No. 209,215 mentioned above) which exhibit a propensity to burn are rendered flame-resistant to an extent at least equal to, and in many cases greater than, the flame resistance of the polycarbonate resin constituent thereof. For example, although a mixture containing 12 percent of polyethylene and 88 percent of homopolymeric bisphenol-A polycarbonate will continue to burn (after removal of a contacting flame) for a period greatly in excess of 20 seconds, and homopolymeric bisphenol-A polycarbonate will continue to burn for a period of from 15 to 20 seconds, a resinous mixture containing 82 percent of homopolymeric bisphenol-A polycarbonate, 12 percent of polyethylene and 6 percent of a copolymer of tetrabromobisphenol-A and bisphenol-A will become extinguished in less than 7 seconds after the contacting flame is removed. In addition to exhibiting an increased flame resistance, the polycarbonate resin mixtures of the invention possess all of the desirable properties of the unmodified polycarbonate materials, particularly from the standpoint of moldability and impact strength.

The amount of polycarbonate resin employed in the practice of this invention in the improved flame-resistant compositions varies from 70 weight percent to 99 weight percent based upon the total weight of the resin mixture. The expression "polycarbonate resin" as used herein is meant to embrace within its scope carbonate polymers of dihydric phenols which are free of halogen substitution, as well as carbonate copolymers of such dihydric phenols with glycols, such as ethylene glycol or propylene glycol, for example; dibasic acids, such as, for example, isophthalic or terephthalic acid; and hydroxyl or acid-terminated polyesters, such as, for example, the hydroxyl or acid-terminated polyester of neopentyl glycol and adipic acid. Such polycarbonate resins may be prepared by reacting a dihydric phenol free of halogen substitution with a carbonate precursor such as phosgene, a haloformate or a carbonate ester. Generally speaking, the resulting carbonate polymers may be typified as possessing recurring structural units of the formula:

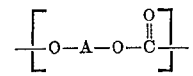

where A is a divalent aromatic radical of the dihydric phenol employed in the polymer producing reaction. Preferably, the polycarbonate resins used to provide the flame-resistant mixtures of the invention have intrinsic viscosities (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2 bis-(4-hydroxyphenyl)-propane; hydroquinone; resorcinol; 2,2 bis-(4-hydroxyphenyl)-pentane; 2,4′ dihydroxydiphenyl methane; bis-(2 - hydroxyphenyl)-methane; bis-(4 - hydroxyphenyl)-methane; bis-(4-hydroxy-5-nitrophenyl)-methane; 1,1 bis-(4-hydroxyphenyl)-ethane; 3,3 bis-(4 - hydroxyphenyl)-pentane; 2,2′ dihydroxydiphenyl; 2,6 dihydroxy naphthalene; bis-(4-hydroxyphenyl)-sulfone; 2,2′ dihydroxydiphenyl sulfone; 4,4′ dihydroxydiphenyl ether; and 4,4′ dihydroxy-2,5-diethoxydiphenyl ether. A variety of additional dihydric phenols free of halogen substitution which may be employed to provide such carbonate polymers are disclosed in U.S. Patent 2,999,835—Goldberg, assigned to the assignee of the present invention. It is, of course, possible to employ two or more different dihydric phenols or, as stated above, a dihydric phenol in combination with a glycol, a hydroxy or acid-terminated polyester, or a dibasic acid in the event a carbonate copolymer rather than a homopolymer is desired for use in the preparation of the flame-resistant polycarbonate mixtures of the invention.

When a carbonate ester is used as the carbonate precursor in the polymer-forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated at reduced pressures of the order of from about 10 to about 100 mm. of mercury, preferably in an inert atmosphere, such as nitrogen or argon, for example.

Although the polymer-forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952), pages 616 to 620. The amount of such catalyst, if used, is usually small, ranging from about 0.001 to about 0.1 percent, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di (tolyl) carbonate.

A preferred method for preparing the carbonate polymers suitable for use in providing the flame-resistant polycarbonate mixtures of the present invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylaniline, quinoline, etc.). The acid acceptor may be used undiluted or diluted with inert organic solvents as, for example, methylene chloride, chlorobenzene, or 1,2 dichloroethane. Tertiary amines are advantageous since they are good solvents as well as acid acceptors during the reaction.

The temperature at which the carbonyl halide reaction proceeds may vary from below 0° C. to above 100° C. The reaction proceeds satisfactorily at temperatures from room temperature 25° C. to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymers which may be used to provide the flame-resistant polycarbonate resin mixture of the invention comprises adding phosgene to an alkaline aqueous suspension of the dihydric phenol used. This is preferably done in the presence of inert solvents such as methylene chloride, 1,2 dichloroethane and the like. Quaternary ammonium compounds may be employed to catalyze the reaction.

A fourth method for preparing such carbonate polymers involves the phosgenation of an agitated suspension of the anhydrous alkali salts of the dihydric phenol used in a nonaqueous medium such as benzene, chlorobenzene, and toluene. This reaction is illustrated by the addition of phosgene to a slurry of the sodium salt of 2,2 bis-(4-hydroxyphenyl)-propane in an inert polymer solvent such as chlorobenzene. The organic solvent should preferably be a polymer solvent but need not necessarily be a good solvent for the reactants.

Generally speaking, a haloformate, such as the bis-haloformate of 2,2 bis-(4-hydroxyphenyl)-propane may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer nonsolvent, such as heptane or isopropanol. Alternatively, the polymer solution may be heated to evaporate the solution.

In order that those skilled in the art may better understand how the present invention may be practiced, the following examples are given by way of illustration and not by way of limitation. All parts and percentages are by weight unless otherwise noted. All of the carbonate polymers used were prepared by phosgenating the desired dihydric phenols in a methylene chloride system containing pyridine as the acid binding agent. In the following examples, 2,2 bis-(4-hydroxyphenyl)-propane is designated as "BPA"; 2,2 bis-(3,5-dibromo-4-hydroxyphenyl)-propane is designated as "TBBPA" and 2,2 bis-(3,5-dichloro-4-hydroxyphenyl)-propane is designated as "TCBPA." The polymers were precipitated from the reaction mixture by the addition of heptane, heptane and water, or methanol, and subsequently were air-dried overnight in an air-circulating oven at 75–80° C. and then redried overnight at 125–130° C. The resin mixtures were prepared by physically blending the modifier in powder form with the polycarbonate resin powder and the mixtures dried in an air-circulating oven at 125–130° C. overnight, and subsequently extruded in a 1⅛″ John Royle extruder with controllers for all zones set at 430 to 620° F. The extrudate was chopped into pellets ⅛″ diameter and ⅛″ long. These pellets were dried in an air-circulating oven at 250° F. and subsequently molded into 2½″ by ½″ by ⅛″ impact bars in the 2½ ounce Van Dorn press at 550 to 650° F. on the cylinder and nozzle and 220° F. on the mold. The flame resistance of the samples tested was determined by the modified Underwriters' Laboratory technique which comprised mounting the 2½″ by ½″ by ⅛″ impact bars immediately above a ⅜″ bore Bunsen burner having a 1¼″ blue inner cone for 15 seconds and then removing the flame. The time, in seconds, which the specimen continued to burn was measured from the instant the flame was removed from under the specimen. Intrinsic viscosities of the polymers employed were measured in p-dioxane in deciliters per gram at 30° C.

*Example I*

By the method outlined above, specimen samples were prepared from various mixtures of (1) a carbonate homopolymer of BPA having an intrinsic viscosity of 0.58 and (2) a carbonate copolymer of 35 weight percent of TBBPA and 65 weight percent of BPA having an intrinsic viscosity of 0.42. The samples were tested by modified Underwriters' Laboratory technique for resistance to flammability as described above and for impact strength as determined by the Izod Impact tester.

TABLE I

| Sample | Wt. Percent of BPA Carbonate Homopolymer | Wt. Percent of Copolymer TBBPA/BPA | Extinguish Time (secs.) | Izod Impact, ft. lbs., in. of Notch |
|---|---|---|---|---|
| A (control) | 100 | 0 | >20 | 17.1 |
| B | 85 | 15 | 2.6 | 16.8 |
| C | 75 | 25 | 1.1 | 16.1 |
| D | 70 | 30 | 1.4 | 12.7 |
| E | 40 | 60 | <1.0 | 3.0 |

*Example II*

Specimens were also prepared employing homopolymers of TBBPA and TCBPA separately in the test bars.

TABLE II

| Sample | Wt. Percent of BPA Carbonate Homopolymer | Wt. Percent of TBBPA Homopolymer | Wt. Percent of TCBPA Homopolymer | Extinguishing Time (secs.) |
|---|---|---|---|---|
| 1 | 95 | 5 | 0 | 3.0 |
| 2 | 90 | 10 | 0 | <2.0 |
| 3 | 95 | 0 | 5 | 10.0 |
| 4 | 90 | 0 | 10 | 7.0 |

Impact strength could not be determined because the test bars were not uniform in structure. The homopolymers of TBBPA and TCBPA did not sufficiently melt in the extruder under extrusion temperatures because of the extremely high melting temperature of the homopolymers. Therefore, the extrudate contained unmelted clumps of TBBPA and TCBPA respectively in the test specimens randomly distributed. Impact strength test was meaningless.

Example III

Specimens were also prepared employing a carbonate copolymer of 35 weight percent of tetrachlorobisphenol-A and 65 weight percent of bisphenol-A. The flame resistance results obtained were as follows:

TABLE III

| Sample | Wt. Percent of BPA Carbonate Homopolymer | Wt. Percent of Copolymer TBBPA/BPA | Extinguish Time (secs.) | Izod Impact, ft. lbs., in. of Notch |
|---|---|---|---|---|
| A (control) | 100 | 0 | >20 | 17.1 |
| F | 85 | 15 | 10 | 12.5 |
| G | 70 | 30 | 5 | 2.5 |
| H | 55 | 45 | 3 | 2.0 |

This example shows that to obtain the flame resistance comparable to the copolymer used employing tetrabromobisphenol-A, an increasingly greater amount is needed which then results in a molded article having poor impact strength as shown by the Izod Impact tester.

As shown in the examples, the carbonate copolymer used in admixture with a polycarbonate resin provided a moldable flame resistant polycarbonate resin mixture which when molded, provides a molded article having the excellent properties of a polycarbonate and in particular impact strength. When employing carbonate homopolymers of tetrabromobisphenol-A or tetrachlorobisphenol-A good flame resistance was obtained when so employed with a polycarbonate resin. However, the mixture could not be properly molded because of the unmelted particles of the homopolymeric materials.

By virtue of the present invention, there is provided a new class of polycarbonate resin mixtures having improved flame resistance which are particularly useful in molding powder formulations, either alone, or in combination with fillers, such as for example, diatomaceous earth, silica, and carbon black, to make molded parts of various shapes. They are also useful in preparing gaskets, tubing, and other materials having improved flame resistance.

Films and fibers of the material may be beneficially oriented or drawn at elevated temperatures such as from 50° to 200° C. Fibers of the material may be used for yarn, thread, bristles, rope, etc. and are readily dyed.

What is claimed is:

1. A moldable flame-resistant polycarbonate resin mixture consisting of (1) 70–99 weight percent of a polycarbonate resin of a dihydric phenol, and, correspondingly, (2) 30–1.0 weight percent of a carbonate copolymer based on the total weight of the polycarbonate resin mixture; said carbonate copolymer consisting of 45–25 weight percent of tetrabromobisphenol-A and, correspondingly, 55–75 weight percent based on the weight of the copolymer of another compound selected from the group consisting of a dihydric phenol, a glycol and a dicarboxylic acid, and mixtures thereof, and wherein said copolymer has an intrinsic viscosity of 0.2–0.7.

2. The composition of claim 1 wherein the copolymer is 65 weight percent of tetrabromobisphenol-A and correspondingly 35 weight percent of bisphenol-A.

3. The composition of claim 1 wherein the polycarbonate resin is the reaction product of phosgene and bisphenol-A.

References Cited

UNITED STATES PATENTS

| | | | |
|---|---|---|---|
| 3,004,935 | 10/1961 | Raley et al. | 260—2.5 |
| 3,038,874 | 6/1962 | Laakso et al. | 260—42 |
| 3,058,946 | 10/1962 | Nametz | 260—42 |
| 3,119,787 | 1/1964 | Laakso et al. | 260—47 |

FOREIGN PATENTS 857,430  12/1960  Great Britain.

MURRAY TILLMAN, *Primary Examiner.*

J. T. GOOLKASIAN, *Assistant Examiner.*